Figure 1:
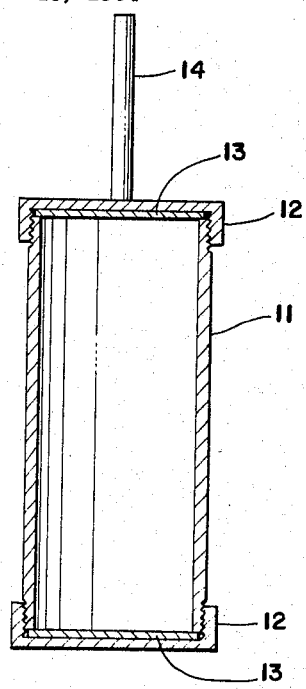

Oct. 11, 1966  J. M. DERFER  3,278,623
ALPHA PINENE ISOMERIZATION PROCESS AND PRODUCT
Filed Feb. 19, 1964                                    2 Sheets-Sheet 1

Oct. 11, 1966  J. M. DERFER  3,278,623
ALPHA PINENE ISOMERIZATION PROCESS AND PRODUCT
Filed Feb. 19, 1964  2 Sheets-Sheet 2

3,278,623
ALPHA PINENE ISOMERIZATION PROCESS
AND PRODUCT
John Mentzer Derfer, Jacksonville, Fla., assignor to The Glidden Company, Cleveland, Ohio, a corporation of Ohio
Filed Feb. 19, 1964, Ser. No. 345,934
29 Claims. (Cl. 260—675.5)

This invention relates to the substantially nondestructive isomerization of α-pinene to economically recoverable β-pinene, and to the resulting isomerizate richer in β-pinene than in related pinene isomerization and disproportionation products.

Customarily naturally-occurring β-pinene has been isolated from certain α-pinene-rich turpentines, e.g., gum and sulfate turpentine from U.S. sources. Beta pinene is useful as a raw material for producing terpene resins and Nopol (6,6-dimethyl bicyclo(3,1,1)-2-heptene-2 ethanol) regardless of its optical configuration, and is particularly valuable as a raw material in the synthesis of fine chemicals such as l-menthol and di-citronellol when such pinene has high optical activity (laevo rotation).

Alpha pinene is much more abundant and has been less valuable as a starting material for chemical syntheses. It is available from virtually all world turpentine supplies, typically, gum, wood, and sulfate turpentine in the U.S. and many foreign turpentines. Accordingly, there has been interest in converting α-pinene to β-pinene for a number of years, but the prospects for economic commercial operation heretofore have been slight.

While isomerization of β-pinene to α-pinene is well known, and readily accomplished by heat and by the use of a wide variety of catalysts (page 143, Egloff et al., A.C.S. Monograph Series No. 88), for a number of years it was thought that the reaction was not reversible (e.g., Simonsen "The Terpenes," vol. 2, pages 198–199, and Egloff et al., above, page 118). Even as late as 1957 Wystrach et al., J.A.C.S., 79, pages 5786–5789, considered the possibility of reversible reaction, but concluded that formation of β-pinene from α-pinene was thermodynamically unfavorable (page 5788). Nevertheless, the interest in converting α-pinene to β-pinene has continued. It was proposed, for example, to make a boron derivative of α-pinene from which β-pinene could be obtained (Brown, J.A.C.S. 82, pages 2074–2075, June 1960).

Additionally, recent articles published in the Soviet Union indicate the possible existence of a reversible reaction between α-pinene and β-pinene, notably: Rudakov and Shestaeva, Zhur. Obshchei Khim., 25, No. 3, pages 627–631 (1955); Jour. Gen. Chem. U.S.S.R. 25, pages 597–600 (English translation).

In that work the authors employed titanic acid as the catalyst for isomerizing α-pinene into a mixture of various products, for example, camphene, β-pinene, limonene, alloocimene, α-terpenene and other hydrocarbons, a process essentially destructive of the pinene because it forms mainly products other than β-pinene. The yields of β-pinene are indicated as 1.5% and 0.7% of the α-pinene treated, and the equilibrium ratio of β-pinene to α-pinene as 0.018 and 0.015, respectively. There is little to indicate, however, that the β-pinene formed was an equilibrium product, and it could actually have been a product from rearrangement of other terpene hydrocarbons. The principal product was camphene. Beta pinene was not isolated from the product, but merely indicated by determination of absolute rotary dispersions and the preparation of derivatives for analysis. Other Russian authors, I. I. Bardyshev and V. I. Efimenko, in Doklady Akad. Nauk, Beloruss S.S.R., 2, pages 232–236 (1958) (C.A. 54, page 8885), and the same authors in Voprosy Khim. Terpenov i Terpenoidov, Akad. Nauk. Litovsk S.S.R., Trudy Vsesoyuz. Soveshchaniya, Vil'nyus 1959, 123–35 (pub. 1960) (C.A. 55, 15534), reported testing rosin as a catalyst for the reaction with what appears to be broadly similar technique and result. It is apparent that such performances are not of commercial value for the conversion of α- to β-pinene because there was a high proportion of undesirable byproducts which hinder significantly the clean separation of α-pinene from β-pinene and the economic recovery of β-pinene in high purity for chemical use.

I have now discovered a process for the substantially non-destructive isomerization of α-pinene to β-pinene using an α-pinene supply having up to about 5, i.e., 0 to about 5, weight percent β-pinene in it, the output of the process being richer in β-pinene than the input. Broadly, the process comprises establishing vapor or liquid phase contact between the pinene supply and a transitory hydrogen acceptor catalyst under neutral to basic conditions in a reaction zone maintained between about room temperature and about 300° C., and withdrawing from the reaction zone an isomerizate enriched in β-pinene.

Also, I have found that, for a particular operating temperature in the range stated, a useful equilibrium between α- and β-pinene appears to be approached in a practical, short time, and it favors enhanced concentrations of β-pinene as the operating temperature is increased, provided that production of related pinene isomerization and disproportion products i.e., byproducts) is substantially avoided or suppressed.

A further aspect of my invention is a novel pinene isomerizate eminently suitable for economic recovery of β-pinene, said isomerizate consisting essentially of 3–10% β-pinene, 87–97% α-pinene and 0–3% related pinene isomerization and disproportionation products, the concentration of β-pinene being greater than the concentration of said related products.

The isomerization reaction can be illustrated thus:

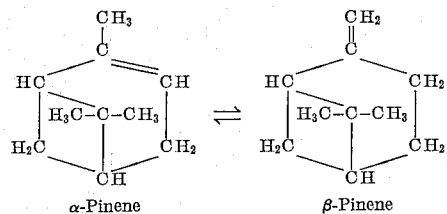

α-Pinene      β-Pinene

Related isomerization products include limonene, delta-pinene and camphene. Further, disproportionation products of limonene which can be encountered are cymene, carvomenthene and para menthane. The formation of these materials is destructive of the pinene supply and generally undesirable. If hydrogen is present, some pinane can be formed; it has a boiling range very close to that of camphene.

The drawings show various ways for practicing my invention. FIGURE 1 is a simple austenitic stainless steel bomb which I have used for screening operations. Vessel 11 is a 4-inch long stainless steel pipe (¾ inch standard I.P.S.) threaded on both ends, sealed with lead gaskets 13 and screwed-down caps 12 on each end. Rod 14 projects from the top cap and is connected to an agitator, not shown, for agitating contents of vessel 11, which is conveniently immersed in an oil bath to control reaction temperature. The top cap is removed, the vessel charged with α-pinene and catalyst, the top cap replaced, and the operation run for a desired time period.

Figure 2:
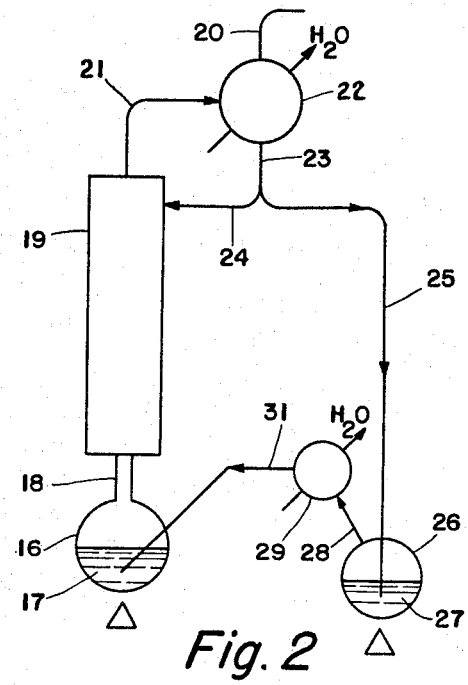

FIGURE 2 is a flow diagram of an atmospheric pressure process which I have used for the isomerization using glass equipment. Externally heated kettles 16 and 26 are charged with α-pinene initially, the α-pinene indicated as items 17 and 27, respectively. Vessel 26 is also charged with catalyst. Rising from vessel 16 is tube 18, fractional distillation column 19 packed with ¼ inch stainless steel protruded packing, vapor tube 21, and water cooled total condenser 22 which is vented to atmosphere by vent 20. Condensate from the condenser flows out tube 23, a portion is returned through inlet 24 as reflux to column 19, and the balance flows through tube 25 into vessel 26. The material in vessel 26 is maintained at boiling with vapors ascending tube 28 and passing through total condenser 29. The condensate is recycled into vessel 16 by tube 31. During operation β-pinene is formed in vessel 26 and is distilled over to vessel 16, while recovered α-pinene from the rectification in column 19 refluxes the column and feeds vessel 26; the concentration of the higher boiling β-pinene gradually builds up in vessels 16 and 26.

Figure 3:
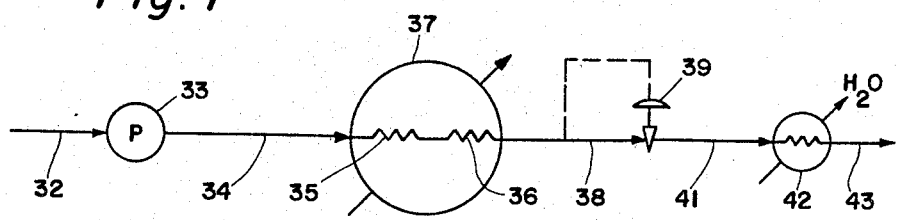

FIGURE 3 is a flow diagram of a continuous unit I have used for conducting the isomerization using austenitic stainless steel equipment. Liquid phase α-pinene is supplied to a system through pipe 32 by pump 33, through line 34 and into preheater 35. It then flows directly into catalyst chamber 36. The preheater and catalyst chamber are totally immersed in a molten salt bath of controlled temperature indicated by vessel 37 with a heat flux arrow therethrough. When the isomerization is conducted in liquid phase, back pressure control valve 39 is adjusted to maintain liquid phase conditions in the preheater, catalyst chamber and outlet line 38. When isomerization is conducted in vapor phase, back pressure control valve 39 is left open. In either case the isomerizate flows through the valve, out line 41 and into product cooler (condenser when the vapor phase operations are used) 42 and out discharge line 43. The isomerizate collected can be fractionated to recover α- and β-pinene, the recovered α-pinene suitably being recycled, if desired, to inlet 32 and the β-pinene reserved as production.

Figure 4:
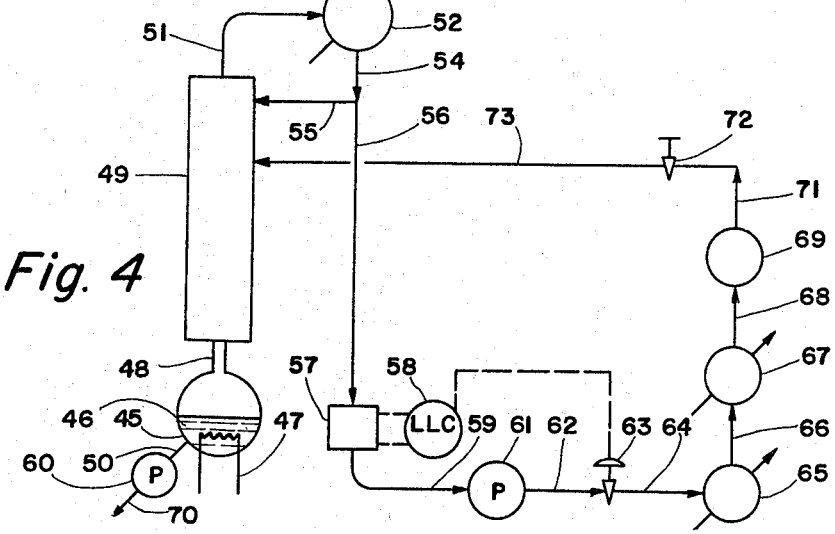

FIGURE 4 is a flow diagram of a pilot plant installation I have used successfully for both liquid and vapor phase catalysis operations using carbon steel equipment. Vapor phase operation will be described. Kettle 45 is charged initially with about 500 lbs. of α-pinene 46. The kettle, reboiled by steam heater 47, communicates with distilling column 49 by pipe 48. The column is packed with ¼-inch stainless steel protruded packing. Overhead vapors from the distilling column pass through line 51 through total condenser 52. The system is vented through line 53 to a steam jet exhauster to give typically a top distilling column total pressure of 201 mm. Hg and a kettle pressure of 230 mm. Hg. The top column temperature typically is about 112° C. and the kettle temperature 117° C. A reduced pressure is used on the column to maintain maximum kettle temperature not substantially above about 120–125° C., thereby effectively suppressing any substantial degree of thermal isomerization.

The overhead condensate flows through line 54. A portion is diverted to the top of the column as reflux through line 55 to provide a total internal reflux ratio in the column of about 14:1. The balance of the condensed distillate flows through line 56 into receiver 57 equipped with liquid level control 58. Condensate from the receiver passes to pump 61, through line 59, out line 62, through pump discharge control valve 63 regulated by the liquid level controller, then through line 64 and into steam heated vaporizer 65. The vapors pass through line 66 into superheater 67 where typically they are heated from about 183° C. inlet temperature to 223° C. outlet temperature. The superheater vapors pass through line 68 and into catalyst chamber 69, in this case a vertical pipe having inlet temperature 217° C. and outlet temperature 177° C. The vapor phase isomerizate passes through line 71 through valve 72 and, still in vapor phase, through line 73 directly into distilling column 49. Typically the pressure on the discharge of pump 61 is about 28 p.s.i.g. and on the catalyst chamber outlet line 71 about 5 p.s.i.g.

The operation can be conducted intermittently by allowing β-pinene concentration to build up in kettle 45 to a desired level, e.g., about 40% in about 7 days, then the kettle contents rectified without further recirculation through the vaporizer, preheater, and catalyst chamber on the righthand side of the diagram. If desired, however, the operation can be maintained continuously, suitably by charging fresh or recovered α-pinene supply continuously into receiver 57 or a point downstream therefrom before the vaporizer by means not shown, and continuously withdrawing a β-pinene-rich bottoms product (e.g., 80–90% β-pinene) from kettle 45 by means of line 50, pump 60 and outlet line 70.

Figure 5:
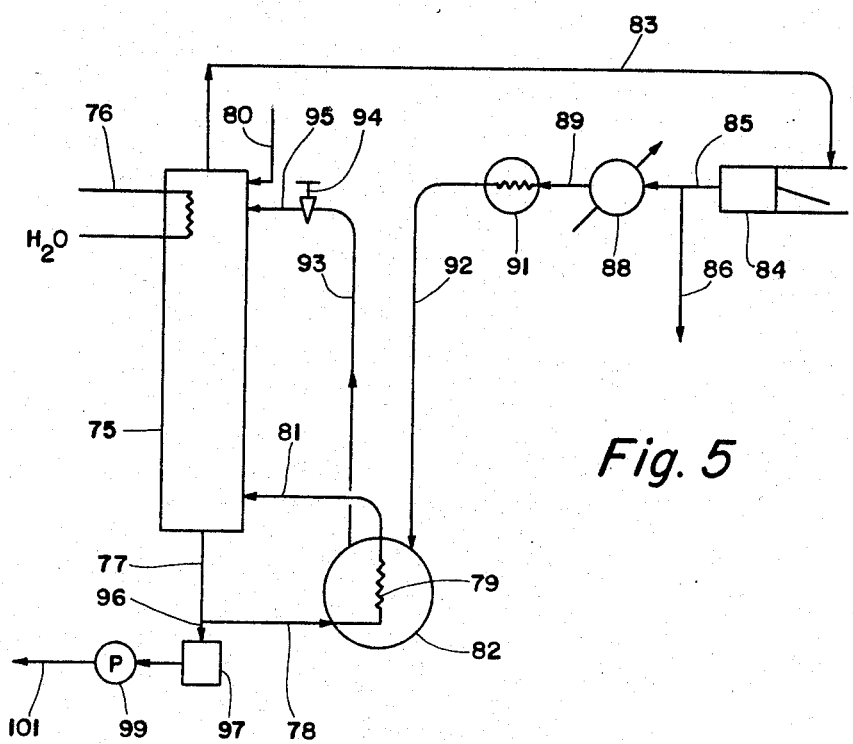

FIGURE 5 shows another production arrangement in a flow diagram. Makeup liquid phase α-pinene is fed to the top of distilling column 75 through line 80 continuously as a reflux to the column. Reflux is also assisted and adjusted by dephlegmator 76. Alpha pinene-rich distillate vapors pass through line 83, into the suction of compressor 84, discharge through compressor discharge line 85 into superheater 88, then through line 89 into catalyst chamber 91. The vapor system is purged by means of line 86. Discharged vapor phase isomerizate from the catalyst chamber passes through line 92 into heat exchanger 82, out line 93, through back pressure control valve 94, and into distilling column 75 by means of inlet 95.

Heat exchanger 82 operates as a reboiler at the base of the distilling column, the reboiler being fed by thermosyphon through lines 77, 78, heat exchange tubes 79, and reboiler return line 81. A bottoms product rich in β-pinene is withdrawn continuously through line 96, passes into receiver 97, through line 98, pump 99 and product outlet 101. The system is operated with catalysis in the vapor phase and a distillation pressure reduced sufficiently to give a column bottoms boiling temperature of about 120° C. The catalysis zone is maintained at about 200° C.

Figure 6:
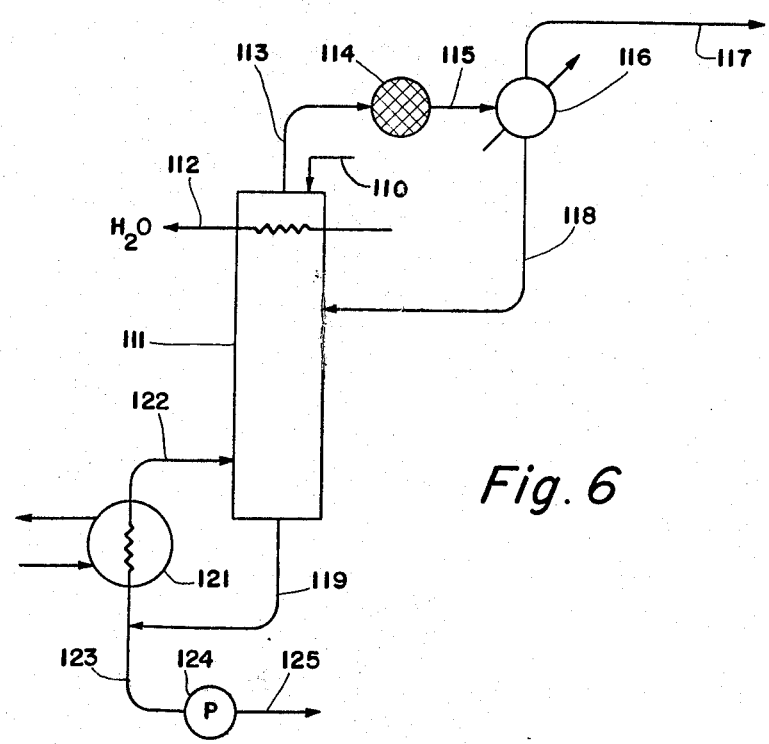

FIGURE 6 shows another production arrangement in flow diagram. In this operation distilling column 111 is refluxed by makeup α-pinene fed through line 110 and dephlegmator 112. The distillate vapors pass through line 113 into catalyst chamber 114, out line 115, and into total condenser 116. The condensate, which is the isomerizate, is fed through line 118 as feed to distilling column 111 between the rectification and stripping sections. Line 117 passes to an exhausting system, not shown, to maintain total system pressure desirably below atmospheric, and thereby lowering the column bottom temperature and suppressing thermal isomerization. In this system the equipment is simple, but because isomerization is done at a reduced pressure, thus a lowered temperature, there is not as much conversion of α-pinene to β-pinene per pass in the catalyst unit as there is in higher temperature catalytic operations represented, for example, by FIGURE 4.

Distilling column bottoms are reboiled by a thermosyphon passing through line 119 into reboiler 121, suitably heated by an external heat exchange fluid, and back to the column by line 122. A bottoms product, rich in β-pinene, is withdrawn through line 123, pump 124 and outlet 125.

The prime α-pinene supply for my process is a pure or virtually pure α-pinene. However, the usual commercial grade of α-pinene distillate contains a percent or two of camphene as an indigenous impurity; such grade is economical and quite suitable for my purposes. Additionally, because β-pinene customarily is recovered by fractional distillation of sulfate or gum turpentine, one could use turpentine directly as the α-pinene supply, for example, feeding it into the distilling operation such as the one shown in FIGURE 4 to obtain primarily α-pinene as an overhead distillate as pinene supply for the isomerization reaction zone feed while accumulating a bottoms product of β-pinene, dipentene, oxygenated terpenes and sesquiterpenes, e.g., anethol, caryophyllene, and methyl chavicol. The bottoms product could then be fractionated to recover β-pinene and the other high-boiling components. The pinene supply is, for all practical purposes, anhydrous, and advantageously can be water washed or caustic soda treated prior to use to remove chance acidity.

The catalysis appears to involve a deprotonation-protonation sequence. Catalysts of practical activity for my purpose include: palladium, platinum, nickel, ruthenium, rhodium, sodium, sulfur, and iodine, all of these in elemental form; palladium chloride, and platinum oxide. Materials which showed inconsequential or no catalytic activity included: mercury, calcium carbonate, Raney copper, zinc chloride, copper chromite, molybdenum trioxide, zirconium-promoted nickel, cobalt metal, cobalt on kieselguhr, copper-cadmium-chrome, chrome-alumina, silver oxide, nickelous chromate, ceramic pall rings, palladium iodide, and sodium hydroxide. Many other materials were tested also, and found to be either deleterious because in their presence mainly or exclusively related pinene isomerization and disproportionation products were produced, or they had little or no activity in yielding a β-pinene in a practical operating period. These materials included: activated carbon, iron, vanadium pentoxide, nickel tungsten sulfide, molybdena-alumina, acidic ion exchange resin, adsorptive clay, silica, lithium aluminum hydride, sodium hydride, boric acid, fumaric acid, maleic anhydride, iodine monochloride, sodium methylate, potassium hydroxide, methanolic potassium hydroxide, maleic anhydride, zinc chloride, quinoline hydro iodide, benzoic acid, alcoholic sulfuric acid, pyridine hydrobromide, sodium amide, chloroplatinic acid, ultra-violet light, selenium metal, mercuric sulfide, dimethyl sulfate, allyl sulfide, chromium trioxide, and chromium ammonium sulfate.

The best of all the catalysts, and by far the most practical that I have found, is elemental palladium, preferably deposited on an inert support, that is, one that is neutral or basic such as alumina, charcoal, calcium carbonate, asbestos, dolomite, thoria, or the like. I have found that about 0.5–3.6% palladium mounted on alumina pellets, e.g., ⅛″ x ⅛″ cylindrical pellets, is excellent and preferred. For general operation when using a powdered catalyst I find it advantageous to use more palladium on the support, generally between about 0.5 and 5% palladium.

Other than sodium, the elemental metals that I have found to be suitable are the Group VIII metals having atomic number from 28–78, inclusive, all of which are highly active hydrogenation-dehydrogenation catalysts and which can sorb hydrogen readily at my operating temperatures (nickel, ruthenium, rhodium, palladium, osmium, iridium, and platinum). While not intending to be bound by any theory, it is my belief that under the conditions of operation the palladium chloride and platinum oxide catalysts that I have tried function satisfactorily because there is sufficient metal present in some stage of their existence as contact catalysts. Most of the useful catalyst types that I have found are solid phase contact catalysts and are not apparently homogeneous with the pinene supply, but the catalysis could be at least to some extent homogeneous as indicated by the usefulness of iodine, sulfur, and potassium t-butoxide.

I have found it essential for the substantially non-destructive isomerization of α-pinene to β-pinene to maintain the reaction mixture catalyst, and its support, if a support is used, non-acidic in any sense of the word, either where considered as a conventional acid of conventionally measurable acidity by titration or the like, a Lewis acid, or a material which reacts with a Hammett indicator to give an acid indication. Thus, pure alumina, e.g., from aluminum hydroxide or aluminum isopropylate, is a suitable support whereas silica gel, which reacts as acid to neutral red Hammett indicator, is deleterious as are clays, silica-alumina, and other well-known petroleum cracking catalysts. The Hammett indicators I refer to are described in: the Hammet et al. article in J.A.C.S. 54, page 2721 (1932); J.A.C.S. 78, page 5491 (1956); the Benesi article in J.A.C.S. 78, pages 5490–5494 (1956); and J. Phys. Chem. 61, page 970 (1957). Benesi describes to a value of $H_0$ less than $+1.5$ to obtain cracking activity, and this is the region I have found must be avoided in the catalyst or its support. The Benesi method is valuable where acidity cannot be measured by a conventional pH measurement or the like to give an indicated value below 7.

Thus, the reaction environment should be neutral to basic when measured with neutral red Hammett indicator. Acidic material inherent in or sorbed on the catalyst or the catalyst support is very bad. A simple illustration of this is my finding that acetic acid inactivates an otherwise active and useful palladium on charcoal catalyst. Other illustrations include my findings that acidic cracking catalysts such as silica-alumina, tungsten-alumina, and molybdena-alumina when used alone or as a support for an otherwise active catalyst give rise to essentially nothing but byproduct formation.

The Group VIII elemental metal catalysts, and the palladium chloride and platinum oxide that I have used are treated preferably with molecular hydrogen to activate them, e.g., passing hydrogen gas over them at a temperature between room temperature and about 180° C. for several minutes to an hour. Resulting sorbed (e.g., "chemisorbed") hydrogen makes the metal catalyst immediately very active for my operation, and, if catalytic activity falls, the catalyst can be reactivated simply by passing additional molecular hydrogen gas over the catalyst apart from or mixed with pinene vapors. Elemental sodium, sulfur, iodine, and potassium t-butoxide do not require such hydrogen treatment to show fair to good activity immediately. They, like the group VIII catalysts, seem to be able to accept hydrogen from the pinene supply in a transitory manner, possibly yielding traces of NI, NaH, and $H_2S$ as an ephemeral intermediate in the reaction. The hydrogen treatment of the Group VIII metal catalysts, of course, makes for production of a small amount of pinane in the isomerizate as it is desorbed, but this can be tolerated because it is in such a small proportion in the isomerizate.

I prefer a fixed contact catalyst bed for efficiency of operation though I can use the catalyst suspended in a reaction mixture, e.g., in the liquid phase. Innocuous solvents can also be present in the operation without apparent harm to the catalysis and can be used in some cases advantageously, if desired, to lower the boiling temperature of the isomerizate in the fractional distillation thereof for recovery of α- and β-pinene, e.g., by formation of azeotropes with one or the other isomers. However, the use of such azeotroping substances further complicates separation in other respects; therefore, I prefer to avoid the presence of extraneous solvents in either the catalysis or the separation operation.

Extremely significant in my process is the preservation of the optical activity of the pinene supply. Thus, starting with laevo α-pinene from selected gum or sulfate turpentine, I can produce laevo-β-pinene and can recover unreacted laevo-α-pinene without noticeable increase in the dextro rotatory forms. Conversely, using an α-pinene from Mexican turpentine which is rich in d-α-pinene, I can obtain d-β-pinene and unreacted d-α-pinene in the isomerizate and avoid undesirable further structural rearrangement to the corresponding laevo-forms.

In room temperature operation with my catalysis I find that the equilibrium between α- and β-pinene approached in a practical operating period is about 3% β-pinene; at 150° C. it is about 4%; it is about 5½–7% β-pinene at 220° C. For practical operating purposes I prefer to operate between about 150° C. and about 225° C. to obtain enhanced β-pinene concentrations in the isomerizate. Above this temperature the formation of thermal isomerization and degradation products (byproducts) appears to be accelerated when appreciable contact times are permitted, e.g., a minute or more, between catalyst and the pinene supply. Because I can achieve substantial conversion of α- to β-pinene even closely approaching equilibrium in mere tenths of a second with a very active catalyst such as elemental palladium, I can operate at a temperature as high as about 300° C. and get a reasonably good operation using restricted average contact time, e.g., using vapor phase operation.

In a flow operation I compute average contact time to be the quotient in consistent units of the pinene capacity of the catalytic reaction zone divided by the volumetric input of pinene supply thereto per unit time corrected to average temperature and pressure conditions in the catalytic reaction zone. I have operated successfully using contact times as low as a few tenths of a second upwards to many hours. For vapor phase operation and maximum use of a given volume of catalyst I prefer use of contact times between about 0.1 and about 1 second. In liquid phase operations I prefer a contact time of about 0.5–2 minutes for efficiency and economy. The only criticality I have noted in length of contact time is the desirability to avoid prolonged times (over 60 seconds) in operations at a temperature above about 225° C. for suppressing byproduct formation.

When operating in the preferred temperature range I can use contact times that are extremely short, e.g., below about one tenth of a second and obtain substantial conversion of α- to β-pinene, but I do not know if equilibrium is approached closely or substantially in such short times. For ease and economy of separation of β-pinene from α-pinene it is, of course, generally desirable to produce an isomerizate as rich in β-pinene as possible with concomitantly little or no by-products, and to feed the catalytic reaction zone with recovered α-pinene as low in β-pinene as possible.

The most practical product recovery separation that I have found is fractional distillation, suitably at a maximum temperature not above about 200° C. and preferably about 125° C. to suppress thermal formation of by-products in the distillation. Other conventional processes that I can use for separating α- from β-pinene in the isomerizate are based on the diverse physical and/or chemical properties of the two materials. They include: thermal diffusion; gas diffusion; vapor phase chromatographic separation using bases such as polyester resins, polyamide resins, or resinous alkylene oxide condensation products; liquid phase chromatographic separation such as over a high-boiling mineral oil sorbed on clay; selective crystallization to get off the lower melting alpha; zone melting of a frozen isomerizate; liquid extraction using a lower alkanol such as ethanol or methanol; or a selective reaction of one of the pinenes preferentially to the other, such as the reaction of β-pinene with formaldehyde to form nopol at 150–175° C., which reaction does not take place with α-pinene.

The following examples show ways in which I have operated my process and obtained the novel isomerizate rich in β-pinene amenable to economic recovery of the β-pinene and the unreacted α-pinene, but the examples should not be construed as limiting the invention. One skilled in the art of terpene chemical operations will recognize how important it is to suppress formation of related isomerization products such as menthadienes (limonene chiefly), camphene, cymene, and alloocimene because they boil at a higher temperature than β-pinene and are comparatively difficult to separate therefrom efficiently.

The α-pinene supply used in all cases was recovered from sulfate turpentine, the technical grade containing 98% α-pinent and about 2% camphene as an indigenous impurity. Where a purer grade of α-pinene was used, containing less than about 1% extraneous materials, the pinene supply was considered "pure" for all practical purposes. In all cases quantitative analysis of the feed and output was done by vapor phase chromatography using as a base "Carbowax 20M," the trademark for an ethylene oxide condensation product having average molecular weight of about 20,000.

All temperatures are given in degrees Centigrade, and all percentages are weight percentages unless otherwise expressly indicated. Additionally, in some cases infra-red spectrophotometry was used to identify β-pinene, and the β-pinene was also cracked to form myrcene as a means of identification.

*Example 1*

Screening operations were conducted using the apparatus of FIGURE 1. In each instance the bomb was charged with 6 grams of α-pinene and 0.1 gram of catalyst, then sealed and immersed in an oil bath with agitation for a controlled time period. Typical operations were as follows:

The catalyst used was elemental sulfur and the charge, technical grade α-pinene. Operation was for five minutes at 235° C. The isomerizate analyzed 4.4% β-pinene, 1.25% limonene, 2% camphene (which was present in the charge) and the balance α-pinene.

The catalyst was crystalline iodine, and the charge pure α-pinene. Operation was for 5 minutes at 240° C. The isomerizate analyzed 4.5% β-pinene, 1.1% camphene and pinane, and the balance α-pinene.

The catalyst was sodium metal and the charge pure α-pinene. Operation was at 200° C. for 4 hours. The isomerizate analyzed 4.5% β-pinene, 3% limonene and the balance α-pinene.

The catalyst was Raney nickel activated with gaseous hydrogen for about an hour at about 100° C. The operation was for 15 minutes at 200° C. using technical α-pinene. The isomerizate analyzed 4.7% β-pinene, 4.2% camphene and pinane (2% camphene being present in the charge), and the balance α-pinene. In a similar operation Rufert nickel catalyst gave about 4½% β-pinene in 26 hours.

The catalyst was $PdCl_2$. The operation was conducted for 6 hours using pure α-pinene at 200° C. The isomerizate analyzed 2% β-pinene, 1.3% camphene and pinane, and the balance α-pinene.

Similar screening tests on supported and hydrogen-activated rhodium metal, platinum metal, and ruthenium metal indicated catalytic activity for making β-pinene, but by far the most active was 0.5–5% palladium metal variously supported on alumina, carbon, dolomite, asbestos, and calcium carbonate; it was more active than even finely-divided unsupported palladium.

*Example 2*

The apparatus used was that shown in FIGURE 3. The catalyst was 0.5% palladium supported on alumina in the form of ⅛" diameter by ⅛" high cylindrical pellets. Temperature of the operation was 200° C., maintained by a salt bath, the liquid holdup in the catalyst chamber 29 ml. (at room temperature and pressure), and the liquid feed rate of technical α-pinene was 32 ml. per minute. Sufficient back pressure was maintained on the catalytic apparatus to maintain completely liquid phase conditions in the reactor, the pump pressure being from 80 to 140 p.s.i.g. The catalyst was activated before use by purging the apparatus at atmospheric pressure with hydrogen gas, going from room temperature to about 180° C. over a period of about an hour. The isomerizate collected analyzed 5% β-pinene, 2% camphene (originally in the feed) and 93% α-pinene.

In a similar operation, except that it was run at 222° C., under vapor phase isomerization conditions feeding in 16 ml. per minute (liquid) technical α-pinene, the isomerizate collected analyzed 5.5% β-pinene, 2% camphene, and the balance α-pinene. Average contact time in the reaction zone was 0.43 second.

Example 3

The apparatus used was as shown in FIGURE 2, and the catalyst used was 5% palladium metal supported on vegetable charcoal powder. Three grams of catalyst and 100 ml. of pure α-pinene were charged into vessel 26. Vessel 16 initially was charged with 900 ml. of pure α-pinene. The distillate from vessel 26, containing isomerizate, fed into distilling kettle 16 continuously; the operation was as described in connection with FIGURE 2. Levels in the two kettles were maintained substantially constant by controlling the boiling rates therein from heat supplied from external sources. External reflux on the rectifying column was maintained for the first 23 hours at 11:1, and for the last 117 hours it was 5:1. The catalyst had been activated with hydrogen gas for ½ hour at 110–115° C., at atmospheric pressure prior to use. At the end of the 145-hour run the analysis of accumulated isomerizate distilland in vessel 16 was as follows: 52% α-pinene, 41.5% β-pinene, 1.6% pinane and camphene, 3.2% limonene, and 1.6% para cymene. Top temperature of the distilling column was 152–155° C. Essentially the same temperature was maintained in the catalytic isomerization reactor.

Example 4

A semi-continuous operation was maintained as described typically in connection with FIGURE 4 above, allowing kettle 45 to build up in isomerizate distilland. After 14½ hours' initial operation, using a 500 lb. charge to kettle 45, the kettle analysis was 9.7% β-pinene, 1.6% pinane, 4.2% camphene and the balance α-pinene. The catalyst used was ½% palladium metal deposited on ⅛" x ⅛" alumina pellets which had been previously activated by passing gaseous hydrogen thereover at atmospheric pressure and a temperature of about 180° for about an hour. The conversion of α- to β-pinene in the catalytic reactor was about 5.5% per pass. The reactor was operated in the vapor phase, and the average contact time was about 0.9 second. Rate of flow of α-pinene-rich distillate through the catalyst bed was about 25 lbs. per hour, the charge technical.

Example 5

In further exploration of catalysis for the isomerization carbonium-ion type homogeneous catalysis was tried using as catalyst potassium tertiary butoxide. A flask was charged with 27.2 grams of pure alpha pinene and 19.2 grams of potassium t-butoxide (equimolar quantities), and the mixture then diluted to 200 ml. with dimethyl sulfoxide. The mixture was maintained for 6 hours at 65–70°. The isomerizate analyzed 3.2% β-pinene, the balance α-pinene, and there were no other isomerization and disproportionation products. In such operation the catalyst vehicle, dimethyl sulfoxide, tends to decompose at a temperature of about 100°, thus such elevated temperature should be avoided. Other $C_{3-6}$ alkali metal alkoxides such as potassium or sodium isopropoxide and potassium t-pentoxide could be expected to give similar catalytic activity.

I claim:

1. A process for the substantially non-destructive isomerization of α-pinene to β-pinene in a volume of α-pinene supply having initial concentration $C_1$ of β-pinene, $C_1$ being from 0 to about five percent by weight, said process comprising: establishing contact between said pinene supply and a transitory hydrogen acceptor catalyst selected from the group consisting of an elemental Group VIII metal having an atomic number between 28 and 78, inclusive, palladium chloride, and platinum oxide, under neutral to basic conditions in a reaction zone maintained between about room temperature and about 300° C., and withdrawing from said reaction zone an isomerizate having concentration $C_2$ of β-pinene, $C_2$ being greater than $C_1$.

2. The process of claim 1 wherein said elemental Group VIII metal is selected from a group consisting of palladium, platinum, nickel, ruthenium, and rhodium.

3. The process of claim 1 wherein said Group VIII metal is deposited on inert support and activated with hydrogen.

4. The process of claim 1 wherein the catalyst comprises palladium metal.

5. The process of claim 1 wherein said reaction zone is maintained between about 150 and 225° C.

6. The process of claim 1 wherein the pinene supply is in the vapor phase.

7. The process of claim 1 wherein the pinene supply is in the liquid phase.

8. The process of claim 1 wherein the contact time between the pinene supply and said catalyst is at least about 0.05 second.

9. The process of claim 1 wherein at least a portion of said pinene supply to said reaction zone comprises α-pinene recovered from said isomerizate.

10. A process for the substantially non-destructive isomerization of α-pinene to β-pinene in a volume of α-pinene supply having initial concentration $C_1$ of β-pinene, $C_1$ being from 0 to about five percent by weight, said process comprising: establishing contact between said pinene supply and a transitory hydrogen acceptor catalyst selected from the group consisting of alkali metals and their $C_{3-6}$ alkoxides, under neutral to basic conditions in a reaction zone maintained between about room temperature and about 300° C., and withdrawing from said reaction zone an isomerizate having concentration $C_2$ of β-pinene, $C_2$ being greater than $C_1$.

11. The process of claim 10 wherein said alkali metal is sodium.

12. The process of claim 10 wherein the catalyst is $C_{3-6}$ potassium alkoxide.

13. The process of claim 10 wherein said reaction zone is maintained between about 150 and 225° C.

14. The process of claim 10 wherein the pinene supply is in the vapor phase.

15. The process of claim 10 wherein the pinene supply is in the liquid phase.

16. The process of claim 10 wherein the contact time between the pinene supply and said catalyst is at least about 0.05 second.

17. The process of claim 10 wherein at least a portion of said pinene supply to said reaction zone comprises α-pinene recovered from said isomerizate.

18. A process for the substantially non-destructive isomerization of α-pinene to β-pinene in a volume of α-pinene supply having initial concentration $C_1$ of β-pinene, $C_1$ being from 0 to about five percent by weight, said process comprising: establishing contact between said pinene supply and a transitory hydrogen acceptor catalyst consisting essentially of sulfur, under neutral to basic conditions in a reaction zone maintained between about room temperature and about 300° C., and withdrawing from said reaction zone an isomerizate having concentration $C_2$ of β-pinene, $C_2$ being greater than $C_1$.

19. The process of claim 18 wherein said reaction zone is maintained between about 150 and 225° C.

20. The process of claim 18 wherein the pinene supply is in the vapor phase.

21. The process of claim 18 wherein the pinene supply is in the liquid phase.

22. The process of claim 18 wherein the contact time between the pinene supply and said catalyst is at least about 0.05 second.

23. The process of claim 18 wherein at least a portion of said pinene supply to said reaction zone comprises α-pinene recovered from said isomerizate.

24. A process for the substantially non-destructive isomerization of α-pinene to β-pinene in a volume of α- pinene supply having initial concentration $C_1$ of $\beta$-pinene, $C_1$ being from 0 to about five percent by weight, said process comprising: establishing contact between said pinene supply and a transitory hydrogen acceptor catalyst consisting essentially of iodine, under neutral to basic conditions in a reaction zone maintained between about room temperature and about 300° C., and withdrawing from said reaction zone an isomerizate having concentration $C_2$ of $\beta$-pinene, $C_2$ being greater than $C_1$.

25. The process of claim 24 wherein said reaction zone is maintained between about 150 and 225° C.

26. The process of claim 24 wherein the pinene supply is in the vapor phase.

27. The process of claim 24 wherein the pinene supply is in the liquid phase.

28. The process of claim 24 wherein the contact time between the pinene supply and said catalyst is at least about 0.05 second.

29. The process of claim 24 wherein at least a portion of said pinene supply to said reaction zone comprises $\alpha$-pinene recovered from said isomerizate.

No references cited.

DELBERT E. GANTZ, *Primary Examiner.*

G. E. SCHMITKONS, *Assistant Examiner.*

UNITED STATES PATENT OFFICE
CERTIFICATE OF CORRECTION

Patent No. 3,278,623　　　　　　　　　　　　　　October 11, 1966

John Mentzer Derfes

It is hereby certified that error appears in the above numbered patent requiring correction and that the said Letters Patent should read as corrected below.

Column 1, line 70, for "232-236" read -- 323-326 --; column 2, line 28, before "i.e.," insert an opening parenthesis; column 6, line 40, for "NI" read -- HI --; column 7, line 74, for "α-pinent" read -- α-pinene --.

Signed and sealed this 29th day of August 1967.

(SEAL)
Attest:

ERNEST W. SWIDER　　　　　　　　　　　　　EDWARD J. BRENNER
Attesting Officer　　　　　　　　　　　　　　　Commissioner of Patents